US011567232B2

(12) United States Patent
Solans et al.

(10) Patent No.: US 11,567,232 B2
(45) Date of Patent: Jan. 31, 2023

(54) METHOD FOR PROVIDING A CALIBRATED ROCK-PHYSICS MODEL OF A SUBSOIL

(71) Applicant: TOTAL SA, Courbevoie (FR)

(72) Inventors: Philippe Solans, Pau (FR); Pierre Thore, Pau (FR); Christian Hubans, Pau (FR)

(73) Assignee: TOTAL SA, Courbevoie (FR)

( * ) Notice: Subject to any disclaimer, the term of this patent is extended or adjusted under 35 U.S.C. 154(b) by 944 days.

(21) Appl. No.: 16/304,892

(22) PCT Filed: May 15, 2017

(86) PCT No.: PCT/EP2017/061627
§ 371 (c)(1),
(2) Date: Nov. 27, 2018

(87) PCT Pub. No.: WO2017/202637
PCT Pub. Date: Nov. 30, 2017

(65) Prior Publication Data
US 2019/0219734 A1    Jul. 18, 2019

(30) Foreign Application Priority Data

May 27, 2016   (EP) .................... 16305616

(51) Int. Cl.
*G01V 99/00*   (2009.01)
*G01V 1/30*    (2006.01)
*G01V 11/00*   (2006.01)

(52) U.S. Cl.
CPC ............ *G01V 99/005* (2013.01); *G01V 1/306* (2013.01); *G01V 11/00* (2013.01)

(58) Field of Classification Search
CPC ....... G01V 99/005; G01V 1/306; G01V 11/00
(Continued)

(56) References Cited

U.S. PATENT DOCUMENTS

2002/0161526 A1    10/2002   Fournier
2010/0142323 A1     6/2010   Chu et al.
2015/0100241 A1*    4/2015   Theune ............... G01V 99/005
                                              702/14

FOREIGN PATENT DOCUMENTS

CN   104516017 A    4/2015
CN   104975851 A   10/2015
(Continued)

OTHER PUBLICATIONS

Menezes, Carlos Antonio, and Olivier R. Gosselin. "From logs scale to reservoir scale: Upscaling of the petro-elastic model." SPE Europec/EAGE Annual Conference and Exhibition. Society of Petroleum Engineers, 2006. pp. 1-16. (Year: 2006).*

(Continued)

*Primary Examiner* — John E Johansen
(74) *Attorney, Agent, or Firm* — Patterson Thuente IP

(57) ABSTRACT

A method for providing a calibrated rock-physics model of a subsoil. First, a geological model of the subsoil comprising a grid made of cells, associated with a rock-physics parameter is obtained. A group of cells forming a calibration body is selected in the grid. The calibration body corresponds to a region of the subsoil having substantially homogenous rock-physics parameter values. Finally, an adjustable constant parameter in a physical equation expressing a relationship between the petro-physical parameter and a petro-elastic parameter in the calibration body is calibrated so as to reduce a mismatch between the petro-elastic parameter estimated using the physical equation and a petro-elastic parameter value determined from inverted seismic data, the calibrated physical equation providing a calibrated rock-physics model of the subsoil in the calibration body.

15 Claims, 5 Drawing Sheets

(58) Field of Classification Search
USPC .................................................... 703/10, 2
See application file for complete search history.

(56) References Cited

FOREIGN PATENT DOCUMENTS

| FR | 2824147 A1 | 10/2002 |
|---|---|---|
| WO | WO 2013/149656 A1 | 10/2013 |
| WO | WO 2015/023265 A1 | 2/2015 |

OTHER PUBLICATIONS

Falcone, Gioia, et al. "Petroelastic modelling as key element of 4D history matching: a field example." SPE Annual Technical Conference and Exhibition. Society of Petroleum Engineers, 2004. pp. 1-15. (Year: 2004).*

Kang, SukSang, et al. "A hierarchical model calibration approach with multiscale spectral-domain parameterization: Application to a structurally complex fractured reservoir." Journal of Petroleum Science and Engineering 135 (2015). pp. 336-351. (Year: 2015).*

Bernardo Moyano et al.: "Quantitative calibration of rock-physics models", SEG Technical Program Expanded Abstracts 2010, Jan. 1, 2010 (Jan. 1, 2010), pp. 2496-2500. (Year: 2010).*

Simon S Payne et al: "An integrated solution to rock physics modelling in fractured carbonate reservoirs", Jan. 1, 2010. pp. 358-362. (Year: 2010).*

PCT International Search Report for PCT/EP2017/061627, dated Aug. 2, 2017, 3 pages.

PCT Written Opinion of the ISA for PCT/EP2017/061627, dated Aug. 2, 2017, 6 pages.

Bernardo Moyano et al: "Quantitative calibration of rock-physics models", SEG Technical Program Expanded Abstracts 2010, Jan. 1, 2010 (Jan. 1, 2010), pp. 2496-2500, XP055393149, DOI: 10.1190/1.3513357.

Menezes C et al: "From Logs Scale to Reservoir Scale: Upscaling of the Petroelastic Model", SPE Annual Technical Conference and Exhibition, XX, XX, Jun. 12, 2006 (Jun. 12, 2006), pp. 1-16, XP002484095.

Simon S Payne et al: "An integrated solution to rock physics modelling in fractured carbonate reservoirs", Jan. 1, 2010 (Jan. 1, 2010), XP055393156, Retrieved from the Internet: URL:http://library.seg.org/doi/pdf/1Q.1190/I.3513596 [retrieved on Jul. 24, 2017].

Pierre Thore et el., "4D Inversion constrained by geological and dynamical information", 2011 SEG, SEG San Antonio Annual Meeting, 5 pages.

P.R. Williamson et al., P064 "A New Approach to Warping for Quantitative Time-Lapse Characterisation", London 2007, EAGE 69$^{th}$ Conference & Exhibition—London, UK, Jun. 11-14, 2007, 5 pages.

E. Piovesanel et al., IPTC 17035, 2013, "AKPO Condensate Field Case Study, Nigeria : 4D Seismic Monitoring of a Complex Deepwater Turbidite Reservoir", 10 pages.

* cited by examiner

METHOD FOR PROVIDING A CALIBRATED ROCK-PHYSICS MODEL OF A SUBSOIL

RELATED APPLICATIONS

The present application is a National Phase entry of PCT Application No. PCT/EP2017/061627, filed May 15, 2017, which claims priority from EP Patent Application No. 16305616.1, filed May 27, 2016, said applications being hereby incorporated by reference herein in their entirety.

FIELD OF THE INVENTION

The invention pertains to the field of geoscientific characterization of a subsoil. In particular, the invention addresses the issue of providing a reliable rock-physics model capable of predicting the evolution of petro-elastic parameters in a subsoil over time. It can be implemented using three-dimensional or four-dimensional seismic data of the subsoil.

BACKGROUND OF THE INVENTION

Geophysical surveys provide data that can be used to obtain a realistic representation of a subsoil, locate hydrocarbon reservoirs and obtain information on the composition of geological layers in the subsoil. Such surveys provide valuable information on the nature of the subsoil, such as for example the layer structure of the subsoil, each layer corresponding to a medium. Each area having substantially identical physical properties in a layer can be referred to as being a "facies", that is to say a region of the subsoil forming a substantially homogeneous soil medium.

The layer structure of the subsoil can be obtained by collecting samples and performing logging acquisition at wells or bore holes drilled in the subsoil. Away from the wells or bore holes, information on the layer structure can be obtained indirectly by analyzing seismic data. Seismic data can be obtained by recording seismic waves emitted from the surface and reflected at interfaces in the subsoil.

Modeling of the structure of the subsoil is subject to some interpretation especially away from areas such as wells, bore holes or areas from which samples were collected, that is to say, away from areas where accurate data can be obtained from measurements. This uncertainty more particularly affects the estimation of petro-elastic parameters of the layers of the subsoil.

Knowledge of these petro-elastic parameters is sought to provide a deeper understanding of the physics of the subsoil in order to describe subsoil more accurately and to be able to predict its future evolution. Petro-elastic parameters, such as for example rock density rho, acoustic wave propagation velocity for P and S waves in the medium Vp, Vs, can be expressed as functions of rock-physics parameters. Rock-physics parameters can be inferred from measurements performed on the subsoil. In the invention, the term "rock-physics parameter" is used to define petro-physical parameters, geomechanical parameters, thermodynamical parameters for example.

Examples of rock-physics parameters include proportion of clay volume in the medium Vcl, porosity, fluid saturations of the medium, pressure or temperature. Physical equations relate rock-physics parameters to petro-elastic parameters. These physical equations form a "rock-physics model".

When a rock physics-model is applied to a rock-physics parameter, or a set of rock-physics parameters (considered as inputs of the rock-physics model), a petro-elastic parameter value or a set of petro-elastic parameter values can be estimated (considered as an output of the rock-physics model).

The rock-physics parameters that describe the physics of the subsoil can include for example: clay volume $V_{cl}$ in the medium, porosity $P_{pore}$ of the medium, fluids saturations in the medium, pressure P in the medium or temperature T.

Seismic measurements provide data that can be inverted to obtain an experimental value for petro-elastic parameters of the subsoil. When there is a mismatch between petro-elastic parameters inferred from inverted seismic data and petro-elastic parameters estimated using a rock-physics model, either the rock-physics model or the geological model can be the source of the mismatch. Prior art techniques do not provide a reliable method to determine what should be calibrated, nor how. Calibration involves adjusting constant parameters in the physical equations of the rock-physics model, but this operation is generally not very efficient in effectively reducing the mismatch to a sufficient degree.

Production in subsoil can involve several actions which affect the structure of the subsoil and the rock-physics parameters of its layers. For example, extraction of hydrocarbons can affect water, oil or gas saturation of layers, pressure in the layers and porosity. Other actions such as injecting fluids to extract the hydrocarbons or to fill empty spaces in the subsoil can also affect petro-elastic parameters. Such changes in rock-physics parameters induce changes in petro-elastic parameters.

To monitor these modifications, four-dimensional or 4D seismic measurements are performed. These measurements involve the recording of seismic data of the subsoil at different times. In addition to 4D seismic measurements, sensors located within boreholes may record the local evolution of values of different parameters of the subsoil (including rock-physics parameters) to track changes in the subsoil as a function of time, such as pressure, fluid flow for example.

The laws of physics provide equations that make up a rock-physics model, capable of expressing a relationship between rock-physics parameters and petro-elastic parameters. For example, Gassmann's equation describes the influence of fluid saturation of a rock on rock density, and seismic wave propagation velocity in the rock. Other examples of physical equations can be found, describing relationships relating other rock-physics parameters to a petro-elastic parameter. It is also possible to produce models of the evolution over time of a petro-elastic parameter when subsoil is subjected to a physical phenomenon such as pumping or injection of fluids. Some laws can be estimated from laboratory measurements performed on rock samples.

These laws comprise several adjustable constant parameters that can be estimated by comparing rock-physics model outputs (petro-elastic parameters) to inverted seismic data and calibrating the adjustable constant parameters to achieve the best fit between inverted seismic data and rock-physics model outputs.

The reservoir model of a subsoil comprises a model of the layer structure of the subsoil filled with the values of rock-physics parameters in this subsoil. Values of rock-physics parameters can be obtained by direct measurements at wells or bore holes as explained above, and can involve experiments conducted on extracted samples to check the physics in a layer of the subsoil. Petro-elastic values within the reservoir model can be estimated by applying rock-physics model equations to the rock-physics parameters of the reservoir model. However, the constructed model is often inaccurate because most of the information, and particularly the values of rock-physics parameters, is extrapolated, and because rock-physics models have their own uncertainties. As a result, petro-elastic parameters generally do not fit well with inverted seismic data (the latter being also subject to some uncertainties due for example to experimental bias). The evolution (spatially or over time) of estimated petro-elastic parameters generally fails to match the evolution of the subsoil when predicted by physical laws, i.e. by an uncalibrated rock-physics model.

A calibration process can be performed on the rock-physics model by adjusting the values of estimated rock-physics parameters in an effort to better match inverted seismic data for base and monitor data sets. Once this adjustment of the values of rock-physics parameters is performed, a calibration of the adjustable constant parameters of the rock-physics model can be implemented, to provide a rock-physics model capable of reproducing the evolution of petro-elastic parameters as a function of time when certain actions (such as production or injection of fluids) are performed in the subsoil.

Prior art methods typically implement this calibration step manually, for example by applying a multiplying factor to the adjustable constant parameters in physical equations in order to optimize the fit between modelled behavior of petro-elastic parameters and the evolution obtained from seismic data. A problem with this approach is that it tries to calibrate the adjustable constant parameters of the rock-physics model randomly in the subsoil, and to fit seismic data with the model over the entire volume of the subsoil.

This approach is unsuccessful because many physical phenomena can occur simultaneously in the subsoil (production, local injection of fluids, local change in porosity or density for example), each being best described by a different physical law, that is to say a different rock-physics model. A global calibration approach over the entire volume of the subsoil artificially tries to fit unsuitable rock-physics model outputs with inverted seismic data that correspond to a much more complex geophysical reality in the subsoil.

Furthermore, the layer structure of the subsoil can change over time, which cannot be accounted for using the "global" approach of the prior art, which is too empirical. Since the rock-physics model that is obtained in the prior art does not accurately reproduce inverted seismic data, it is impossible to know whether this mismatch is due to errors in the calibration process (erroneous values estimated for the adjustable constant parameters of the rock-physics model), errors in the inverted seismic data (due for example to some experimental bias), errors in the rock-physics parameters used to estimate petro-elastic parameters, or errors in the layer structure of the reservoir model.

Prior art generally provides a rough rock-physics model that is not very efficient in predicting the future evolution of the subsoil.

A method for estimating a more reliable rock-physics model of a subsoil to better predict the evolution over time of a subsoil is sought.

SUMMARY OF THE INVENTION

To overcome the above-mentioned drawbacks, the invention provides a method for providing a calibrated rock-physics model of a subsoil comprising:
  obtaining a geological model of the subsoil, the geological model comprising a grid made of cells, each cell being associated with at least one rock-physics parameter,
  selecting at least one group of cells forming a calibration body in the grid, the calibration body corresponding to a region of the subsoil having substantially homogenous rock-physics parameter values across said region;
  calibrating at least one adjustable constant parameter in a physical equation expressing a relationship between the at least one rock-physics parameter and at least one petro-elastic parameter in the calibration body, so as to reduce a mismatch between a value of the at least one petro-elastic parameter estimated using the physical equation and a value of the at least one petro-elastic parameter determined from inverted seismic data, the calibrated physical equation providing a calibrated rock-physics model of the subsoil in the calibration body.

The invention provides a reliable method for calibrating physical equations representing the rock-physics model in the subsoil, so that it can be used to predict the future evolution of the subsoil over time.

As opposed to prior art methods, the invention calibrates rock-physics parameters not over the whole volume of the subsoil, but only in a specific region called a calibration body. This calibration body corresponds to a region of the subsoil in which rock-physics parameters are substantially homogeneous. In particular, the calibration body reduces the portion of subsoil on which a calibration is implemented, to avoid considering a volume of subsoil which is subject to more than one physical phenomenon. As a result, it is easier to reduce the mismatch between a petro-elastic parameter value estimated in the calibration body using the rock-physics model and petro-elastic parameter values derived from inverted seismic data in the calibration body.

According to an embodiment, the method may further comprise, prior to calibrating the at least one adjustable constant parameter and after selecting at least one group of cells forming a calibration body:
  comparing values of the at least one rock-physics parameter from cells of the calibration body and determining a standard deviation of said values;
  updating the calibration body if the standard deviation exceeds a predetermined threshold;

The calibration body should correspond to a region of the subsoil subject to one physical phenomenon, so that rock-physics parameters in the cells of the calibration body have substantially similar values. If the values of the rock-physics parameters in the calibration body do not verify this spatial coherence across cells of the calibration body, it is advantageous to update the calibration body. Determining a standard deviation between values of the rock-physics parameter across cells of the calibration body provides a tool to determine whether the calibration body needs to be updated or not.

According to an embodiment, selecting the at least one group of cells forming the calibration body may be performed by:
  selecting cells belonging to a same homogenous facies of the subsoil.

Cells belonging to a same facies of the subsoil are more likely to have homogeneous rock-physics parameter values therein, and to be subject to only one physical phenomenon explainable by a physical law for example.

According to an embodiment, selecting the at least one group of cells forming the calibration body may be performed by:
  selecting cells corresponding to a region of the subsoil that is subject to a single physical phenomenon responsible for a variation of the at least one rock-physics parameter as a function of time.

According to an embodiment, selecting the at least one group of cells forming the calibration body may be performed by:

selecting cells comprising at least one cell adjacent to a well providing production data.

By selecting cells that are close to a well, the invention has access to more reliable, measured data to estimate the value of petro-elastic parameters using the rock-physics model. Assuming the cells of the calibration body correspond to a region of subsoil having homogeneous rock-physics parameters, the values of the rock-physics parameters measured at the well or bore hole form a reliable reference to compare the value of the rock-physics parameter at the measurement point with the value at cells of the calibration body away from the measurement point. Selecting cells that are close to wells improves the probability that cells of the calibration body will comprise cells that have substantially homogeneous rock-physics parameters and therefore substantially homogeneous petro-elastic parameters.

According to an embodiment, updating the calibration body may be performed by:

removing from the calibration body a cell at which a value of the at least one rock-physics parameter differs from a mean value by more than a predetermined amount.

Such an approach allows to set an acceptable error range for the values of rock-physics parameters, and to define a precise criterion for selecting cells as being part of the calibration body, to enlarge or reduce the size thereof, in order to obtain a better calibration zone for providing a more accurate rock-physics model. One advantageous approach is to select the largest possible calibration body for which rock-physics parameters have values within a narrow range around a mean value, that mean value being close to the value measured at the well or bore hole.

According to an embodiment, updating the calibration body may be performed by:

modifying the value of the at least one rock-physics parameter within a predetermined uncertainty range in accordance with available data.

An update of the values of rock-physics parameters within the calibration body can be advantageous when there is a significant difference between the evolution of a petro-elastic parameter from seismic inversion data and the evolution of the rock-physics model outputs (petro-elastic parameters) within the calibration body. This can be due to an uncertainty on the value of the rock-physics parameter modelled in the reservoir grid, and can be compensated at this step.

According to an embodiment, comparing values of the at least one rock-physics parameter from cells of the calibration body and determining a standard deviation of said values may be implemented in time, at dates of four-dimensional data for base and monitor values of the at least one rock-physics parameter to estimate spatial coherence of said values in the calibration body at different times, wherein the at least one rock-physics parameter is a static rock-physics parameter.

Even though a calibration body may comprise only cells that have homogeneous rock-physics model inputs (petro-physical parameters), there is a risk that the structure of the layers in the subsoil changes and renders a calibration body less reliable to estimate a proper rock-physics model. Checking that the values of static rock-physics model inputs remain homogeneous over time is a way of avoiding this bias.

According to an embodiment, calibrating at least one adjustable constant parameter may be implemented on four dimensional data.

According to an embodiment, calibrating at least one adjustable constant parameter may be implemented on three dimensional data.

Three-dimensional data can be used for certain types of physical equations, for example those involving static rock-physics parameters.

According to an embodiment, the method may further comprise:

using the rock-physics model to predict a future evolution of the subsoil.

According to an embodiment, the method may further comprise:

using the rock-physics model to modify the geological model of the subsoil when the at least one petro-elastic parameter obtained via three-dimensional seismic inversion substantially differs from an evolution of the at least one petro-elastic parameter estimated using the rock-physics model.

When petro-elastic parameters obtained from 3D seismic data do not match values obtained using a calibrated rock-physics model, the geological model of the subsoil is likely to be the source of the mismatch, and a change in the layer structure or rock properties of the geological model can be determined to minimize this mismatch.

According to an embodiment, the method may further comprise:

using the rock-physics model to modify the geological model of the subsoil when an evolution over time of the at least one petro-elastic parameter obtained via seismic inversion substantially differs from an evolution of the at least one petro-elastic parameter estimated using the rock-physics model.

When a rock-physics model is provided, it can be considered as reliable and therefore used to model the evolution of petro-elastic parameters over time and even question the profile of layer structures in the geological model. Indeed, over time, this structure can change, which will be seen when 4D seismic data starts to differ substantially from the behavior predicted using the estimated rock-physics model. Knowing that the rock-physics model has been approved earlier, the method can be used to question the validity of the geological model, which may need to be updated.

According to an embodiment, the at least one rock-physics parameter may be selected from among static parameters and dynamic parameters.

Static rock-physics model inputs, such as for example clay volume, porosity, water or gas saturation and pressure can be quite accurately estimated from measurements made at wells, bore holes or from samples but are more uncertain away from wells and bore holes. Dynamic rock-physics model inputs (pressure changes, saturation changes, temperature changes, stress changes for example) prove to be more challenging to determine and the accuracy of their estimation is significantly enhanced using the method of the invention.

According to an embodiment, the at least one rock-physics parameter may be chosen from among:

a seismic wave propagation speed V in cells of the calibration body, a static rock-physics parameter chosen from among: clay volume $V_{cl}$ in cells of the calibration body, a porosity $P_{pore}$ of the medium in cells of the calibration body, a water saturation $S_{we}$ of the medium in cells of the calibration body, a gas saturation $S_{gas}$ of the medium in cells of the calibration body, an initial pressure $P_{init}$ in the medium in cells of the calibration body, a temperature T in cells of the calibration body, a variation in temperature $\Delta T$ in cells of the calibration body, a dynamic rock-physics parameter chosen from among: a change in pressure $\Delta P$ of the medium in cells of the calibration body, a variation in water saturation $\Delta S_{we}$ of the medium in cells of the calibration body, a variation in gas saturation $\Delta S_{gas}$ of the medium in cells of the calibration body, a variation of the porosity $\Delta P_{pore}$ of the medium in cells of the calibration body, a temperature T in cells of the calibration body, a variation in temperature $\Delta T$ in cells of the calibration body.

The invention is also directed to a non-transitory computer readable storage medium, having stored thereon a computer program comprising program instructions, the computer program being loadable into a data-processing unit and adapted to cause the data-processing unit to carry out a method for providing a calibrated rock-physics model of a subsoil comprising:

obtaining a geological model of the subsoil, the geological model comprising a grid made of cells, each cell being associated with at least one rock-physics parameter, selecting at least one group of cells forming a calibration body in the grid, the calibration body corresponding to a region of the subsoil having substantially homogenous rock-physics parameter values across said region;

calibrating at least one adjustable constant parameter in a physical equation expressing a relationship between the at least one rock-physics parameter and at least one petro-elastic parameter in the calibration body, so as to reduce a mismatch between a value of the at least one petro-elastic parameter estimated using the physical equation and a value of the at least one petro-elastic parameter determined from inverted seismic data, the calibrated physical equation providing a calibrated rock-physics model of the subsoil in the calibration body when the computer program is run by the data-processing device.

BRIEF DESCRIPTION OF THE DRAWINGS

The method of the invention will be better understood by reading the detailed description of exemplary embodiments presented below. These embodiments are illustrative and by no means limitative. They are provided with the appended drawings in which.

For the sake of clarity, the dimensions of features represented on these figures may not necessarily correspond to the real-size proportions of the corresponding elements. Like reference numerals on the figures correspond to similar elements or items.

DETAILED DESCRIPTION OF THE INVENTION

The invention aims to provide a reliable model of the physics of a subsoil capable of predicting its evolution, for example during production of the reservoir. Such a model is called a "rock-physics model" because it is capable of applying physical equations to rock-physics parameters in the geological layers of the subsoil to describe the evolution of the subsoil spatially and/or over time. A rock-physics model is a set of equations, or an equation. Its input can be petro-physical parameters, thermodynamic data and/or geo-mechanical data (hereafter designated using the generic term "rock-physics parameter"). Its outputs are petro-elastic parameters. It is generally applied to a geological model of the subsoil, comprising a grid made of cells, and a model comprising sets of rock-physics parameters describing the physics of each cell. Each cell of the grid is within one layer of the subsoil so that the medium of each cell is substantially homogeneous.

Figure 1:
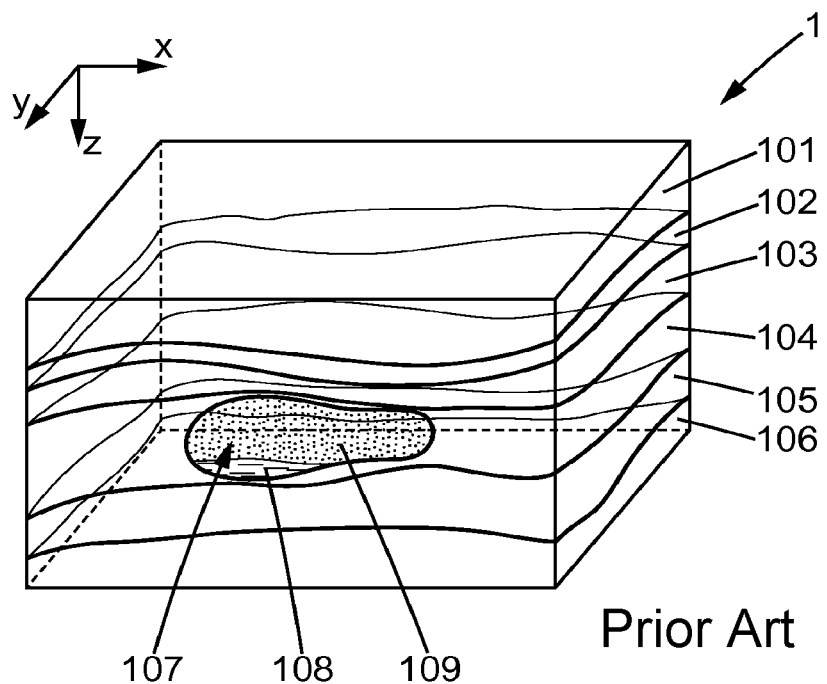
FIG. 1 is a schematic representation of a subsoil comprising several layers.

FIG. 1 illustrates a subsoil 1 comprising a reservoir 107 and a plurality of layers 101-106. Reservoir 107 comprises water 108 and oil 109. Before producing hydrocarbons from reservoir 107, oil 109 fills a significant portion of the volume of reservoir 107.

Figure 2:
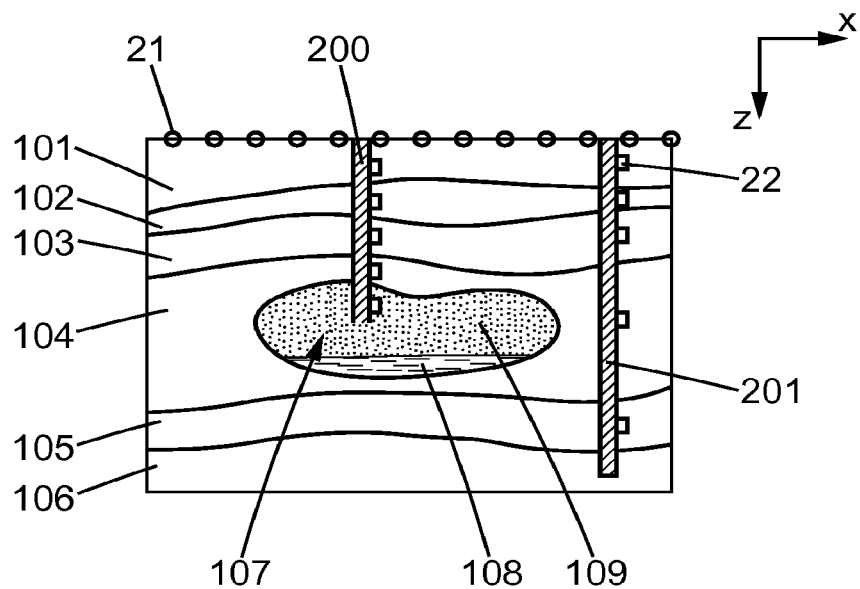
FIG. 2 is a schematic representation in two-dimensions of a the subsoil of FIG. 1, cut along a vertical plane.

Generally, subsoil 1 is monitored at specific locations with sensors as illustrated on FIG. 2.

At the surface, emitters and detectors 21 of seismic waves enable the collection of seismic data. Advantageously, seismic data is acquired at different times to generate a set of four-dimensional or 4D seismic data. Data that is only recorded once (three-dimensional data) can also be used in the context of the invention, to calibrate a rock-physics model involving static petro-physical parameters.

Inversion of seismic data using known algorithms can produce a picture of the structure of layers 101-106 and reservoir 107 in the subsoil 1 and provide information on the evolution of petro-elastic parameters in the subsoil affecting the propagation of seismic waves in these layers. However, inversion is a complex mathematical problem which is prone to uncertainties and requires a comparison with other measurements to extrapolate the most reliable model of the subsoil and its properties.

At wells 200 or bore holes 201, sensors 22 can be placed at different layers to monitor the values and evolution over time of different parameters such as for example water saturation $S_{we}$, gas saturation $S_{gas}$, fluid flows, pressure P, temperature T, variation in pressure $\Delta P$, variation in water saturation $\Delta S_{we}$, variation in gas saturation $\Delta S_{gas}$, variation in the porosity $\Delta P_{pore}$, variation in temperature $\Delta T$. These measurements can be compared with results of seismic inversion to improve the rock-physics modelling of the subsoil.

It is also possible to collect rock samples at wells from the subsoil 1 to test them on the surface and find physical laws describing the geophysical parameters of the rock sample. However, experiments conducted on extracted rock samples generally provide a somewhat inaccurate picture of the behavior of rocks of a facies, for example because of change in condition: pressure, temperature and fluid saturation conditions differ from those that are found in the subsoil, sample state: the sample is taken from subsoil 1 to the surface and moved to the laboratory. It can be deteriorated during transportation, frequency of the measurement: measurements in laboratory conditions will be compared to seismic measurements. Frequency effects are expected, creating for example a mismatch between seismic data and sample measurements.

The invention enables a calibration of the rock-physics model which corrects these inaccuracies and provides better, more reliable physical equations to describe the physics of rocks in the subsoil over time.

Figure 3A:
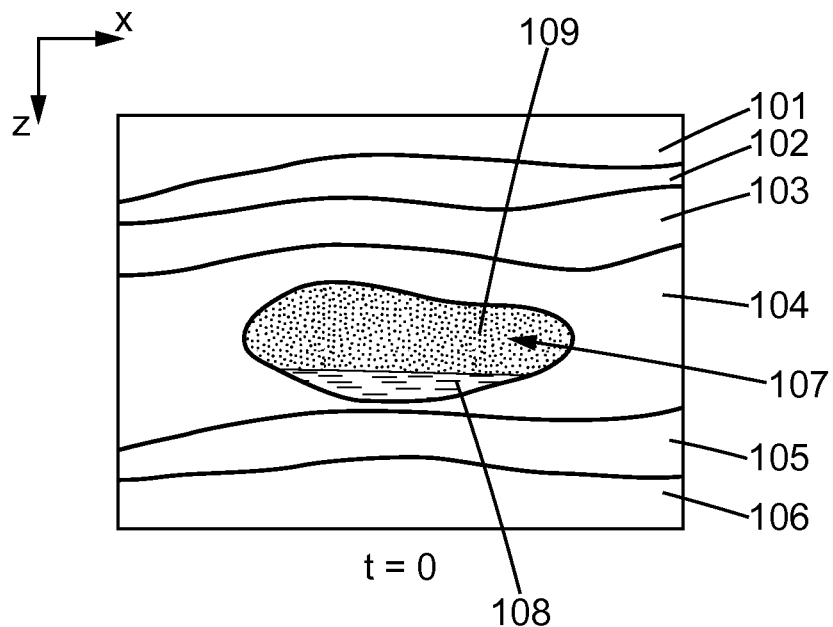
FIGS. 3a and 3b are two-dimension schematic representations of the subsoil of FIG. 1 at two different times during production of the subsoil.
Figure 3B:
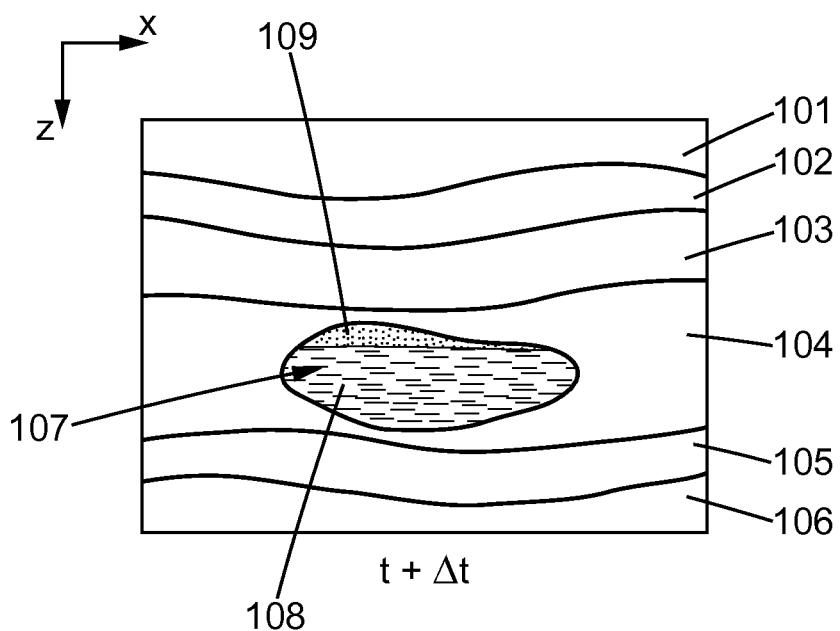

As can be seen on FIGS. 3a and 3b, the layer structure of the subsoil can change over time. This can for example occur when hydrocarbons are produced from reservoir 107. FIG. 3a represents subsoil 1 before producing hydrocarbons from reservoir 107. FIG. 3b represents subsoil 1 at a later date when some hydrocarbons have been produced from reservoir 107. This process not only affects the values of petro-elastic parameters in the layers 101-106 but also affects the position and shape of layers in the subsoil. When production is on-going, the portion of water 108 in the reservoir 107 increases, whereas the portion of oil 109 in the reservoir 107 decreases.

One aspect of the invention is to provide a reliable model of the physics within layers of the subsoil, to be capable of identifying such changes in the layer structure of the subsoil based on seismic data analysis. When a rock-physics model is well-calibrated, mismatch between seismic data and predictions from the rock-physics model can be attributed either to an uncertainty linked to the seismic data or to a reservoir model that is not complete enough (that is to say that should to be updated). With a well-calibrated rock-physics model, there is no need to seek a modification of the set of equations on which it is based to compensate for this mismatch. Instead, the mismatch can be compensated by changing the model of the subsoil by finding a more realistic structure of the layers of the subsoil.

It is to be noted that the invention can be implanted using either three-dimensional seismic data (in particular to calibrate a rock-physics model involving static petro-physical parameters) or four-dimensional seismic data (for example to calibrate a rock-physics model involving dynamic petro-physical parameters).

Figure 4:
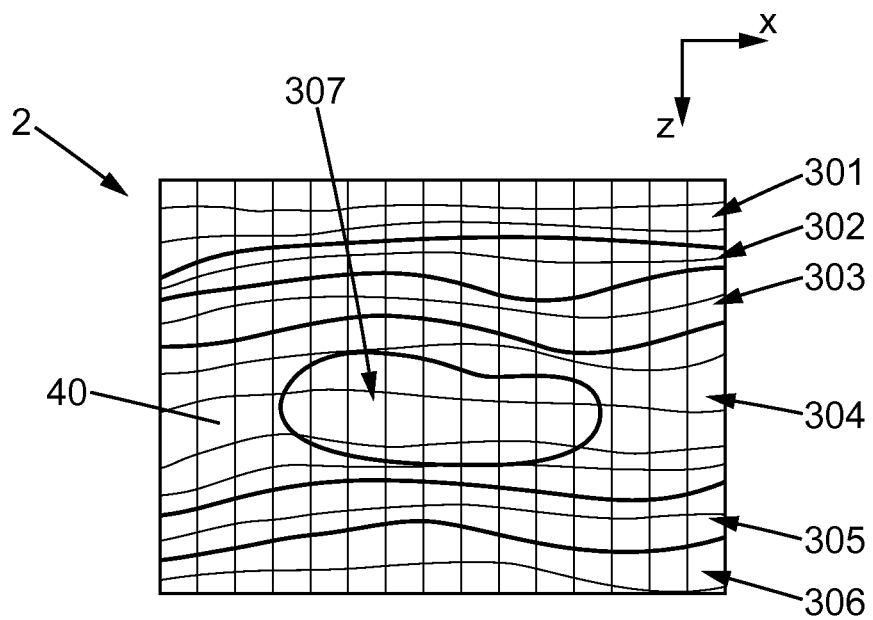
FIG. 4 is a two-dimensional schematic representation of a geological model of the subsoil of FIG. 1 comprising cells.

The method of the invention is implemented on a geological model 2 of the subsoil such as that illustrated on FIG. 4. FIG. 4 shows a reservoir grid made of cells 40. Each cell of the reservoir grid is generally found in one geological layer, represented in the geological model 2 of FIG. 4 with layers 301-306 separated by interfaces. The geological model also comprises a modeled reservoir 307.

At first, a geological model 2 is obtained and rock-physics parameters are associated with cells of the geological model. The values of rock-physics parameters can be determined at this stage based on available data, for example from measurements made by sensors 22 along different positions of wells or bore holes, or from samples collected in the subsoil 1. Away from wells or bore holes, the values of rock-physics parameters are generally extrapolated based on knowledge of the subsoil, and an initial value can be obtained from seismic data taken from a set of measurements. 4D seismic data generally refers to the first set of measurements by calling it "base" whereas subsequent measurements taken at a later time are called "monitor".

Figure 5:
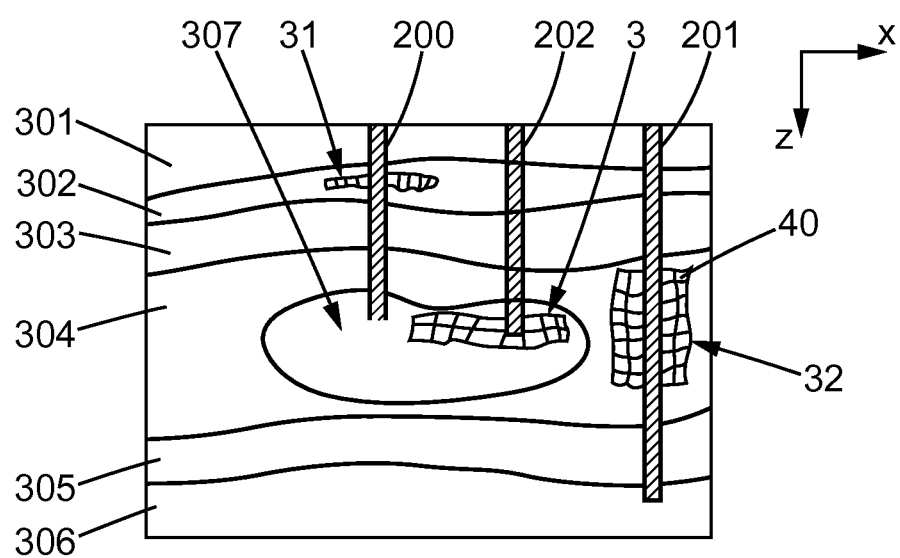
FIG. 5 is a two-dimensional schematic representation of the geological model of FIG. 4 highlighting several calibration bodies around wells or bore holes.

Once the geological model 2 is completed with a set of rock-physics parameter values in each cell, the invention selects at least one group of cells in the geological model 2 to define a calibration body 3, 31, 32, as illustrated for example on FIG. 5. A calibration body 3, 31, 32 is a group of cells of the geological model in which the values of rock-physics parameters are substantially identical.

In practice, cells of a calibration body 3, 31, 32 correspond to a region of the subsoil that has substantially the same petro-physical properties, the same rock-physics model inputs. Such a region can for example correspond to a same layer or facies. In other words, the calibration body comprises cells for which rock-physics parameters have substantially homogenous values.

This spatial coherence of the values is also checked in the calibration body 3, 31, 32 at different times, to make sure that the homogenous static properties remain spatially coherent for base and monitor representations of the geological model 2.

As illustrated on FIG. 5, several calibration bodies 3, 31, 32 can be defined in the geological model 2, in areas for which some data is available. Interesting candidates to define a calibration body are "completion areas" or "completions" along the well, for example at the bottommost extremity of a well. Completion areas, such as that associated with calibration body 3 on FIG. 5 are subject to specific and identifiable transformations over time that can be modelled by a physical law involving rock-physics parameters in the form of an equation for which adjustable constant parameters can be determined. For example, at the well completion, hydrocarbons can be produced from a reservoir 307. This can lead to decrease in pressure and possibly gas coming out of solution, that can be modelled by a physical law involving a variation of some rock-physics model inputs. In the vicinity of the well completion, this physical phenomenon is most likely to follow the predicted behavior and is not likely to coexist, in the calibration body, with another physical phenomenon (such as a water saturation increase for example).

Calibration bodies can also be defined at other areas of the geological model 2, for example in bore holes 201 or at locations other than the completion area of a well 200, 202 as illustrated by calibration bodies 31, 32 on FIG. 5. It is advantageous, however, to have at least one cell 40 of the calibration body 3, 31, 32 adjacent to a region for which measurements are available, to increase the reliability of the values of rock-physics parameters. Therefore, calibration bodies 3, 31, 32 generally have at least one cell adjacent to a well 200, 202 or bore hole 201.

To check the spatial homogeneity of the values of rock-physics model inputs in a calibration body 3, 31, 32, a mean value for a rock-physics model input or set of rock-physics model inputs can typically be determined. This value can for example be the measured value at a well or bore hole. Then the values of the rock-physics model input are compared to determine a standard deviation from the mean value and/or a standard deviation between values of the rock-physics model input in the cells 40.

If the standard deviation is above a certain threshold value, this could be the sign that the calibration body needs to be updated.

Updating the calibration body 3, 31, 32 can typically be done in two ways.

One possibility to correct a spatial inconsistency in the values of rock-physics model inputs is to manually change the values of the rock-physics model inputs if one suspects that there is some error in the values of rock-physics model inputs of the geological model 2. This adjustment can be done within an uncertainty range associated with rock-physics model inputs or based on complementary measurements, from sensors or any knowledge of the field or physics that indicate that a correction of the current values may be advisable.

Another possibility to update the calibration body is to remove a cell for which a standard deviation with respect to the values of the rock-physics model input in other cells of the calibration body 3, 31, 32 is too high. A high standard deviation may be an indication that the calibration body 3, 31, 32 is too large and includes cells corresponding to portions of subsoil for which the physics is different from that describing the physical properties of other cells of the calibration body 3, 31, 32. A higher standard deviation can appear because the size of the cells does not match the anisotropies of the subsoil, the cells generally being too large to accurately represent small inhomogeneities than can be locally encountered in the subsoil.

When the calibration body is verified, and comprises only cells having substantially homogenous rock-physics model inputs, a reliable rock-physics model can be constructed to model the evolution of the petro-elastic parameters as a function of time.

In particular, knowing what happens in the subsoil near a calibration body, for example production of hydrocarbons, injection of water or gas into the subsoil, it is possible to model the evolution of petro-elastic parameters using physical laws of the rock-physics model. Geophysics comprise a number of physical laws to explain the evolution over time of petro-elastic parameters. One example of such laws is Gassmann's equation, describing the influence of fluid saturation of a rock on rock density, and seismic wave propagation velocity in the rock. Other physical laws can be found, either empirical or experimental, linking petro-elastic parameters to rock-physics parameters to explain the physics that is observed in rocks.

The invention proceeds by determining adjustable constant parameters in physical laws that enable the best fit between the evolution of dynamic parameters (changed in reservoir properties) observed in a calibration body, and the evolution of petro-elastic parameters observed on inverted 4D seismic data, within the same calibration body. For example, an equation for which adjustable constant parameters can be expressed as:

$$V_{pwatfin} = V_{pwatinit} \gamma (1 + \alpha A e^{-\beta B \Delta P}) \quad (1)$$

where A and B are constant parameters that can be determined via measurements performed in a lab and $\alpha\gamma\beta$ are adjustable constant parameters also called "meta-parameters". In the above physical equation (1) $V_{pwatfin}$ and $V_{pwatinit}$ represent velocities of P-waves in the medium of the calibration body of a water saturated rock at a first time for $V_{pwatinit}$ and at a later time for $V_{pwatfin}$, and $\Delta P$ represents pressure change applied to the rock sample (when considering experiments conducted on a rock sample to reproduce subsoil conditions). Data obtained from laboratory measurements provide experimental values for the $V_{pwatinit}$, $V_{pwatfin}$ and $\Delta P$, and give a target dependency between these values. "Meta-parameters" $\alpha\gamma$ and $\beta$ are determined through an optimization process comparing both petro-elastic values from 4D seismic inversion with petro-elastic values coming from the calibrated rock-physics model and minimizing their mismatch (for example using L1 or L2 normalization).

Once the "meta-parameters" are determined, a reliable physical law for the rock-physics model is available, and the physics of the subsoil is well-understood to predict its future evolution beyond time frames for which seismic data has been recorded.

Figure 6:
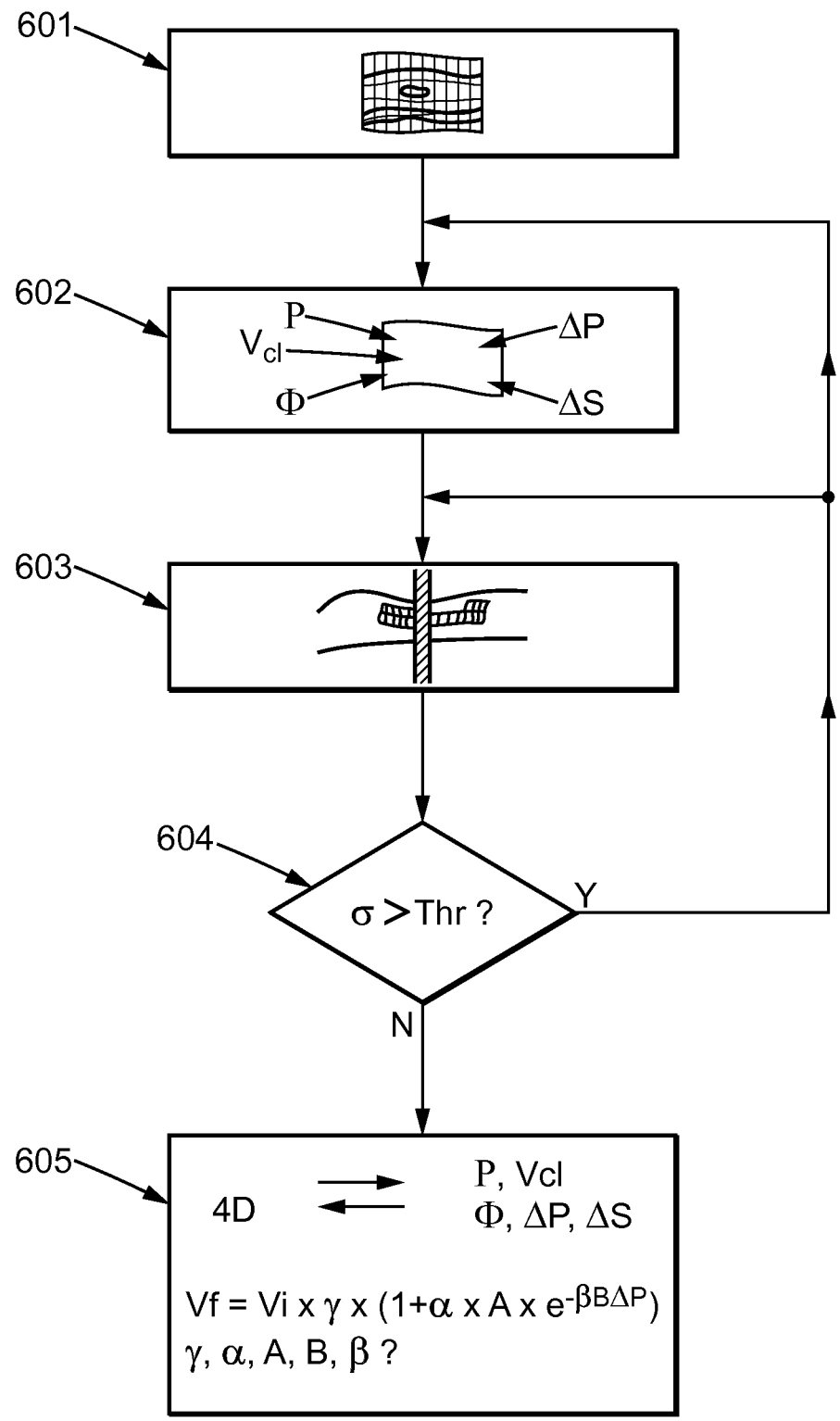
FIG. 6 is a flow chart illustrating steps of the method of the invention.

The main steps of the above-presented method are illustrated on FIG. 6.

First, a geological model 2 comprising cells, each cell being associated with at least one rock-physics parameter, is obtained at steps 601 and 602. Rock-physics parameter values can for example be obtained from available data from sensors and/or seismic data. Then, at step 603, at least one calibration body is defined in the geological model by grouping cells at which rock-physics model inputs have substantially similar values, corresponding to a region of the subsoil having substantially homogeneous physical properties.

At step 604, a standard deviation calculated among values of the rock-physics parameter values in cells of the calibration body is calculated and compared to a predetermined threshold value. If the standard deviation exceeds the threshold, there is deemed to be a problem with the calibration body, that can be corrected either by adjusting values of the rock-physics parameter in the petro-elastic model (return to step 602), or by modifying the size of the calibration body, for example by removing the cell at which the standard deviation is too high (return to step 603).

If the standard deviation is within reasonable bounds in all cells of the calibration body, the calibration body is deemed to be acceptable and meta-parameters are optimized by minimizing the mismatch between seismic data and rock-physics model outputs within the calibration body (step 605). This can be implemented for several calibration bodies simultaneously.

Repeating this process across several calibration bodies corresponding to areas of the subsoil subject to changes over time (because of oil production, or injection of water or gas for example) provides a more accurate picture of the physics of the subsoil than prior art methods that seek to calibrate a rock-physics model over the entire volume of a geological model at once.

The calibrated rock-physics model can be used to accurately predict the future evolution of subsoil when specific actions are performed (oil production, injection of oil gas or water for example).

Furthermore, having a reliable rock-physics model describing the behavior of the subsoil, it is possible to question the model of the layer structure of the subsoil, when inconsistencies are noticed between a behavior predicted by the rock-physics model and seismic data. Instead of questioning the rock-physics model, such inconsistencies can be corrected by modifying the layer structure, therefore providing a valuable insight into the structural changes that occur in the subsoil.

Figure 7:
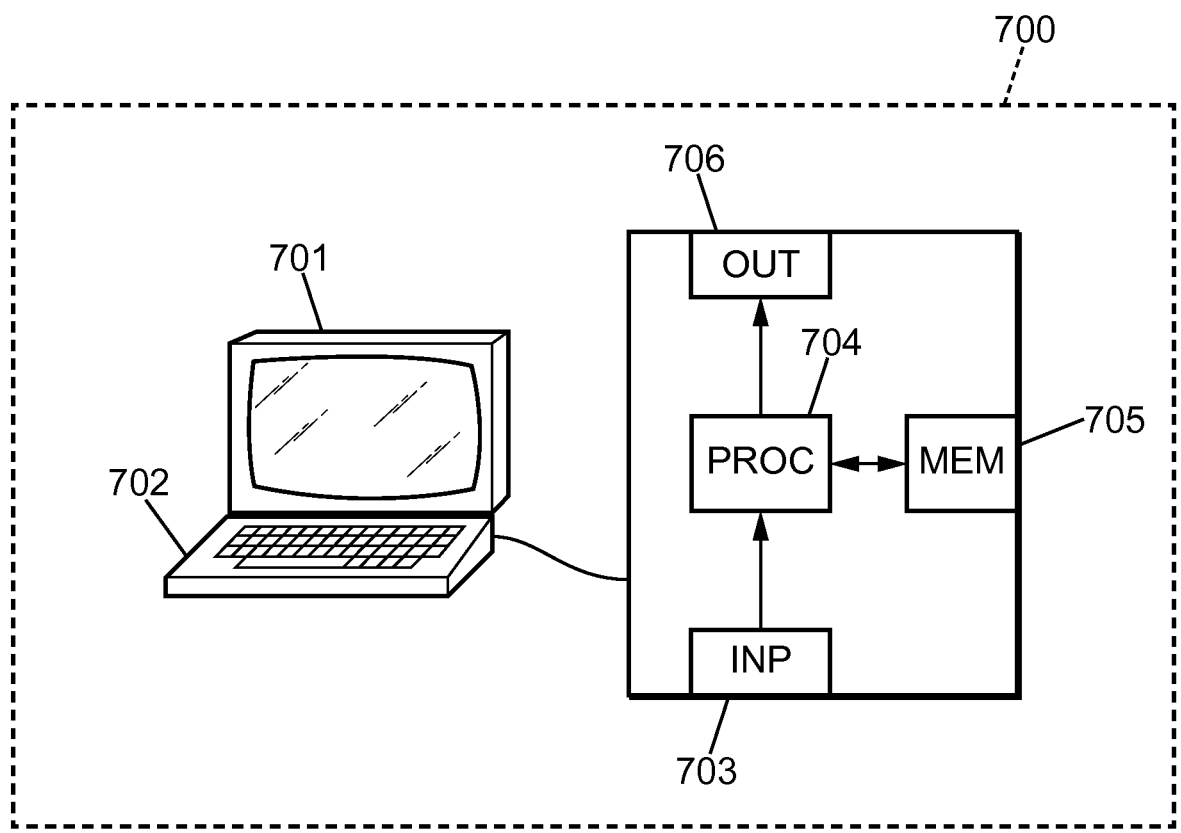
FIG. 7 is a possible embodiment for a device enables the method of the invention to be implemented.

FIG. 7 is a possible embodiment for a device that can be used to implement the above method.

In this embodiment, the device 700 comprises a computer, this computer comprising a memory 705 to store program instructions loadable into a circuit and adapted to cause circuit 704 to carry out the steps of the present invention when the program instructions are run by the circuit 704.

The memory 705 may also store data and useful information for carrying the steps of the present invention as described above.

The circuit 704 may be for instance:

a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the steps of the invention are described within silicon, or a programmable electronic chip such as a FPGA chip (for «Field-Programmable Gate Array»))).

This computer comprises an input interface 703 for the reception of data used for the above method according to the invention and an output interface 806 for providing a stacked model.

To ease the interaction with the computer, a screen 701 and a keyboard 702 may be provided and connected to the computer circuit 704.

Although the above description refers to rock-physics parameters in the plural form, it is possible to implement the method of the invention based on only one rock-physics parameter, advantageously a dynamic rock-physics parameter such as variation in pressure ΔP for example.

The invention provides a more reliable rock-physics model to better describe and predict the behavior of subsoil. The invention uses a methods that is not prone to random adjustments as those of the prior art which heavily rely on human interpretation to artificially fit data that cannot efficiently be compared.

In that respect, the calibration provided by the present invention significantly improves the quality of the rock-physics model that is generated.

The invention claimed is:

1. A method for providing a calibrated rock-physics model of a subsoil using a processor for determining the rock physics of each cell of the subsoil for geoscientific characterization of a subsoil, the method comprising:
measuring seismic data with a seismic sensor,
receiving a geological model of the subsoil, the geological model comprising a grid made of cells, each cell being associated with at least one rock-physics parameter,
selecting at least one group of cells forming a calibration body in the grid, the calibration body corresponding to a region of the subsoil having substantially homogenous rock-physics parameter values across said region; the calibration body does not comprise all the cells of the grid,
calibrating at least one adjustable constant parameter in a physical equation expressing a relationship between the at least one rock-physics parameter and at least one petro-elastic parameter in the calibration body, so as to reduce a mismatch between a value of the at least one petro-elastic parameter estimated using the physical equation and a value of the at least one petro-elastic parameter determined from inverted seismic data, the calibrated physical equation providing through the processor a calibrated rock-physics model of the subsoil in the calibration body;
wherein the method further comprises, prior to calibrating the at least one adjustable constant parameter and after selecting at least one group of cells forming a calibration body: comparing values of the at least one rock-physics parameter from cells of the calibration body and determining a standard deviation of said values; and updating the calibration body if the standard deviation exceeds a predetermined threshold.

2. The method according to claim 1, wherein selecting the at least one group of cells forming the calibration body is performed by:
selecting cells belonging to a same homogenous facies of the subsoil.

3. The method according to claim 1, wherein selecting the at least one group of cells forming the calibration body is performed by:
selecting cells corresponding to a region of the subsoil that is subject to a single physical phenomenon responsible for a variation of the at least one rock-physics parameter as a function of time.

4. The method according to claim 1, wherein selecting the at least one group of cells forming the calibration body is performed by:
selecting cells comprising at least one cell adjacent to a well providing production data.

5. The method according to claim 1, wherein updating the calibration body is performed by:
removing from the calibration body a cell at which a value of the at least one rock-physics parameter differs from a mean value by more than a predetermined amount.

6. The method according to claim 1, wherein updating the calibration body is performed by:
modifying the value of the at least one rock-physics parameter within a predetermined uncertainty range in accordance with available data.

7. The method according claim 1, wherein comparing values of the at least one rock-physics parameter from cells of the calibration body and determining a standard deviation of said values is implemented in time at dates of four-dimensional data for base and monitor values of the at least one rock-physics parameter to estimate spatial coherence of said values in the calibration body at different times, wherein the at least one rock-physics parameter is a static rock-physics parameter.

8. The method according to claim 1, wherein calibrating at least one adjustable constant parameter is implemented on four dimensional data.

9. The method according to claim 1, wherein calibrating at least one adjustable constant parameter is implemented on three dimensional data.

10. The method according to claim 1, further comprising:
using the rock-physics model to predict a future evolution of the subsoil.

11. The method according to claim 1, further comprising:
using the rock-physics model to modify the geological model of the subsoil when the at least one rock-physics parameter obtained via three-dimensional seismic inversion substantially differs from an evolution of the at least one petro-elastic parameter estimated using the rock-physics model.

12. The method according to claim 1, further comprising:
using the rock-physics model to modify the geological model of the subsoil when an evolution over time of the at least one rock-physics parameter obtained via seismic inversion substantially differs from an evolution of the at least one petro-elastic parameter estimated using the rock-physics model.

13. The method according to claim 1, wherein the at least one rock-physics parameter is selected from among static parameters and dynamic parameters.

14. The method according to claim 13, wherein the at least one rock-physics parameter is chosen from among:
a seismic wave propagation speed in cells of the calibration body, a static rock-physics parameter chosen from among: clay volume in cells of the calibration body, a porosity of the medium in cells of the calibration body, a water saturation of the medium in cells of the calibration body, a gas saturation of the medium in cells of the calibration body, an initial pressure in the medium in cells of the calibration body, a temperature in cells of the calibration body, a variation in temperature in cells of the calibration body, and a dynamic rock-physics parameter chosen from among: a change in pressure of the medium in cells of the calibration body, a variation in water saturation of the medium in cells of the calibration body, a variation in gas saturation of the medium in cells of the calibration body, a variation of the porosity of the medium in cells of the calibration body, a temperature in cells of the calibration body, a variation in temperature in cells of the calibration body.

15. A non-transitory computer readable storage medium, having stored thereon a computer program comprising program instructions, the computer program being loadable into a data-processing unit and adapted to cause the data-processing unit to carry out a method for estimating a calibrated rock-physics model of a subsoil for applications in geoscientific characterization of a subsoil, comprising:

measuring seismic data with a seismic sensor, obtaining a geological model of the subsoil, the geological model comprising a grid made of cells, each cell being associated with at least one rock-physics parameter, selecting at least one group of cells forming a calibration body in the grid, the calibration body corresponding to a region of the subsoil having substantially homogenous rock-physics parameter values across said region, the calibration body does not comprise all the cells of the grid; and calibrating at least one adjustable constant parameter in a physical equation expressing a relationship between the at least one rock-physics parameter and at least one petro-elastic parameter in the calibration body, so as to reduce a mismatch between a value of the at least one petro-elastic parameter estimated using the physical equation and a value of the at least one petro-elastic parameter determined from inverted seismic data, the calibrated physical equation providing a calibrated rock-physics model of the subsoil in the calibration body when the computer program is run by the data-processing device, wherein the method further comprises, prior to calibrating the at least one adjustable constant parameter and after selecting at least one group of cells forming a calibration body:

comparing values of the at least one rock-physics parameter from cells of the calibration body and determining a standard deviation of said values; and updating the calibration body if the standard deviation exceeds a predetermined threshold.

\* \* \* \* \*